United States Patent [19]

du Fresne

[11] 4,096,064

[45] Jun. 20, 1978

[54] SYSTEM FOR REMOVAL OF TOXIC HEAVY METALS FROM DRINKING WATER

[75] Inventor: Eugene R. du Fresne, Sierra Madre, Calif.

[73] Assignee: Ameron, Inc., South Gate, Calif.

[21] Appl. No.: 673,964

[22] Filed: Apr. 5, 1976

[51] Int. Cl.² ............................................. B01D 35/00
[52] U.S. Cl. ........................................ 210/120; 210/50; 210/264; 210/282; 210/283; 75/109
[58] Field of Search ................. 210/42 R, 48, 50, 53, 210/52, 282, 283, 188, 120, 26, 264, 266, 287, 290; 75/109, 121, 120, 168 M; 204/149, 151

[56] References Cited

U.S. PATENT DOCUMENTS

| | | | |
|---|---|---|---|
| 2,178,573 | 11/1939 | Gann | 75/168 M |
| 2,398,830 | 4/1946 | Hamilton | 210/233 |
| 2,405,302 | 8/1946 | Griffith et al. | 75/109 |
| 2,905,323 | 9/1959 | Megesi | 75/109 |
| 3,697,567 | 10/1972 | Taylor, Jr. | 210/42 R |
| 3,704,875 | 12/1972 | Waltrich | 210/26 |
| 3,744,995 | 7/1973 | Mackay | 75/109 |
| 3,802,563 | 4/1974 | Sasaki et al. | 210/424 |
| 3,922,224 | 11/1975 | Lewandowski | 210/50 |

Primary Examiner—Wilbur L. Bascomb, Jr.
Assistant Examiner—Benoit Castel
Attorney, Agent, or Firm—Howard A. Silber

[57] ABSTRACT

Toxic heavy metal ions are removed from water by electrochemical replacement as the water flows through a tandem bed of (a) activated zinc and then (b) magnesium alloyed with a minor amount of manganese to inhibit corrosion. The zinc is activated by contact with a noble metal salt. Preferably, fine granules of zinc and Mg/Mn are used. Clogging is prevented by intermittent vacuum degassing of the beds. The activated zinc and the Mg/Mn advantageously are prepackaged and stored in cartridges which become part of the processing column. The Mg/Mn cartridge has a non-reactive atmosphere of e.g., argon, retained by frangible or soluble barriers that hermetically seal the ends of the cartridge. The barriers are torn away or dissolved by the initial water flow when the cartridge is installed. System scale-up is simplified by a "half-length" concept characteristic of the present invention. Specifically, the heavy metal ion concentration is reduced by one-half for each additional fixed distance ("half-length") traversed through the reactant bed.

7 Claims, 2 Drawing Figures

SYSTEM FOR REMOVAL OF TOXIC HEAVY METALS FROM DRINKING WATER

BACKGROUND OF THE INVENTION

1. Field of the invention

The present invention relates to a process and system for the removal of toxic heavy metal ions from water, such removal being accomplished electrochemically by sequential water flow through reactant beds of activated zinc and magnesium/manganese alloy respectively.

2. Description of the Prior Art

Recent studies by the U.S. Geological Survey, the Environmental Protection Agency and others indicate the presence of toxic heavy metals, generally in ionic form, in surface water sources of public drinking water supplies. These metals include among others, arsenic, cadmium, chromium, cobalt, lead, mercury, selenium and zinc. The particular concentrations vary in different geographic areas, in part for geological reason, in part reflecting pollution by manufacturing, chemical processing or mining operations. For whatever reason, the presence of such heavy metal ions, even in small quantities, presents a potential health hazard.

Arsenic, typically in the form of arsenite or arsenate, occurs in many geographic regions, including the southeastern United States, and in Colorado river water sources, due in part to its use in pesticides. Surface water studies in 1970 by the U.S. Geological survey showed over twenty percent of the samples taken had arsenic concentrations greater than 10 micrograms per liter ($\mu g/l$), equivalent to 10 parts per billion (ppb). About 2% of the samples had more than 50$\mu g/l$, the maximum considered safe for drinking water according to standards set in 1962 by the U.S. Public Health Service.

Cadmium occurs in river samples in about one-third of the states, usually in concentrations of from 1 to 10 $\mu g/l$, but occasionally in excess of the 10 $\mu g/l$ upper limit for drinking water set by the U.S. Public Health Service (U.S.P.H.S.). Chromium (hexavalent) rarely occurs at levels above about 5 $\mu g/l$, and so is generally well below the acceptable level of 50 $\mu g/l$. Cobalt concentrations generally are quite low, in the range of from 1 to 5 $\mu g/l$, the latter value being about the upper limit of solubility of cobalt in normal river water.

Lead occurs quite widely in the range of 6 to 50 $\mu g/l$, and occassionally exceeds the U.S.P.H.S. upper limit of 50 $\mu g/l$, but sometimes exceeds 5,000 $\mu g/l$, the recommended (not mandatory) upper limit for drinking water.

Mercury occurs both in dissolved form and in adherence to suspended particles that might be part of the food chain of the aquatic community. Dissolved mercury typically is found in concentrations of up to about 5 $\mu g/l$, the U.S.P.H.S. upper limit for dissolved mercury in drinking water; however, total mercury occasionally is found in excess of 5 $\mu g/l$.

From the foregoing discussion, the most serious heavy metal contaminants in drinking water are arsenic, cadmium, lead and mercury. In addition to the inherent toxicity of these heavy metals, the very low acceptable concentration levels, in the parts per billion range, make detection and control of the metals difficult. Only with the recent availability of equipment for atomic absorption analysis has widespread evaluation of the toxic heavy metal contamination problem been possible.

In the past, various approaches have been suggested for removing heavy metals from water sources. These processes are summarized in the article entitled "Technique for Removing Metals from Process Wastewater" by Theodore Cadman and Robert Dellinger, published in *Chemical Engineering*, Apr. 15, 1974, pages 79-85. They include, among others, (a) chelation and extraction, (b) use of an ion exchange resin for metal ion removal and recovery, (c) use of titanium arsenate as an inorganic ion exchanger, (d) recovery by precipitation using e.g., thioacetamide, chromic salts, dibromo-oxine or calcium hydroxide as the precipitant, and (e) precipitation with a natural polyelectrolyte derived from pectins. None of these techniques has proven satisfactory for large scale, low cost operation as is required in a commercial or municipal drinking water treatment plant.

"Cementation" techniques have been suggested for the removal of heavy metals from solution. In this approach, the metal is displaced by another that is higher in the electromotive series, followed by precipitation of the displaced metal. The cementation reaction has been used for winning metals from ores and for the recovery of precious metals from scrap. A recent publication of the U.S. Environmental Protection Agency entitled "Metallic Recovery from Waste Waters Utilizing Cementation" (EPA-670/2-74-008, January, 1974) concludes that small diameter iron shot is an effective medium for cementation of copper and reduction of hexavalent chromium. However, iron itself forms iron oxide in contact with oxygen dissolved in the water and discolors and contaminates the aqueous solution. An improved one-step exchange treatment is described in the article entitled "Removal of Heavy Metals from Water and Brine Using Silicon Alloys" by James P. McKaveney et. al in *Environmental Science & Technology*, Vol. 6, No. 13, December, 1972, pages 1109-1113. That technique, also disclosed in U.S. Pat. No. 3,766,036, removes ionic metallic impurities from aqueous solutions by using a silicon-metal alloy having an overall electrochemical potential greater than that of the metal to be removed. According to these references, the use of silicon is necessary to modify the chemical nature of the other elements in the alloy so as to permit their use in aqueous solutions as an extractant. For example, barium and calcium, which in their elemental forms react violently with water, can be used when alloyed with silicon as effective electrochemical exchange sources. Silicon alloys of iron, magnesium and other metals also are taught to be useful for electrochemical removal of heavy metal ions.

None of these prior art processes are satisfactory for use in public water supply systems, which require: (1) low cost of equipment and reactant chemicals used in the system; (2) the ability to remove the toxic heavy metal ions which are present in miniscule, parts per billion concentrations, while maintaining the fast flow rates necessary for rapid treatment of very large volumes of drinking water; and (3) operational simplicity that permits operation and maintainence by relatively unskilled employees. A principal object of the present invention is to provide a system for the removal of toxic heavy metal ions which meets all of these requirements for use in a public water supply. Other objects of the invention are: (a) to provide a system for the removal of heavy metal ions from water at fast flow rates using electrochemical displacement; (b) to provide such a system employing sequential treatment by two electrochemically active materials, the second of which has a higher electrochemical potential than the first, to obtain effective removal of a variety of heavy metal impurities; (c) to provide a system wherein the reactant chemicals have a long useful lifetime, typically many months, and (d) wherein the chemicals are prepackaged in containers that become integral components of the processing system, thereby greatly simplifying replacement of the reagents and maintainence of the system.

SUMMARY OF THE INVENTION

These and other objectives are achieved in a system wherein heavy and metal ions are removed from a drinking water supply by directing the water first through a bed of preferably activated zinc particles, and then through a particulate bed of magnesium alloyed with small amounts of manganese to reduce the corrosivity of Mg to a level where it can be used in a flowing water system. The dual bed is intermittently, automatically degassed to remove trapped air and/or generated hydrogen.

Certain heavy metal ions such as mercury ($Hg^{++}$), lead (plumbous $Pb^{++}$), selenous ($SeO_3^=$), arsenite ($AsO_3^=$) and arsenate ($AsO_4^=$) ions are removed primarily by reaction with the granular, activated zinc. Other heavy metals such as cadmium ($Cd^{++}$) ions are removed by the particulate magnesium which also removes residual zinc that may be present in the water flowing from the first stage zinc bed. Advantageously the magnesium/manganese particles are prepackaged in a drum or cartridge having a cylindrical wall of corrosion-resistant plastic, and having air-tight end barriers of frangible or water-soluble material that may be covered with particle-retaining screens and rigid top and bottom lids for storage and shipping. By providing an atmosphere in the cartridge of inert or other gas that is non-reactive with magnesium, the cartridge can be stored and handled safely without risk of corrosive reaction of the magnesium with atmospheric moisture. Preactivated zinc granules may be similarly packaged.

The water treatment plant advantageously is configured so that the magnesium-containing cartridge becomes an integral component of the flow column. That is, the cartridge wall becomes a part of the water-carrying system piping. Thus, when replacement of the Mg/Mn bed is required, water flow is terminated, the old cartridge is removed, a new cartridge is inserted (after removal of the lids), and the flow is renewed. Just prior to cartridge insertion, the protective lids are removed, but the air-tight barriers are not broken. The cartridge is inserted in this condition, so that the magnesium remains in an inert environment until the cartridge is installed. The initial water flow either breaks or dissolves the frangible or soluble barrier.

Water treatment plant design is simplified using the present invention both because of the structural features just described, and because of a "half-length" concept inherent in the present invention. It has been found that if a Zn or Mg/Mn bed of a certain depth will remove one-half of the ions of a certain heavy metal present in the water source (i.e., reduce the concentration of that impurity by one-half), then an additional, like bed depth will remove one-half of the remaining heavy metal ions.

Moreover, for certain heavy metals, notably mercury, the half-length remains constant over very large increases in flow rate. For this reason, reactant material requirements can be substantially minimized by designing systems with high flow rates and with the minimum bed depths required to decrease toxic heavy metal ion concentrations to below acceptable limits.

BRIEF DESCRIPTION OF THE DRAWINGS

A detailed description of the invention will be made with reference to the accompanying drawings wherein like numerals designate corresponding parts in the several figures.

DESCRIPTION OF THE PREFERRED EMBODIMENTS

The following detailed description is of the best presently contemplated modes of carrying out the invention. This description is not to be taken in a limiting sense, but is made merely for the purpose of illustrating the general principles of the invention since the scope of the invention is best defined by the appended claims. Operational characteristics attributed to forms of the invention first described also shall be attributed to forms later described, unless such characteristics obviously are inapplicable or unless specific exception is made.

Figure 1:
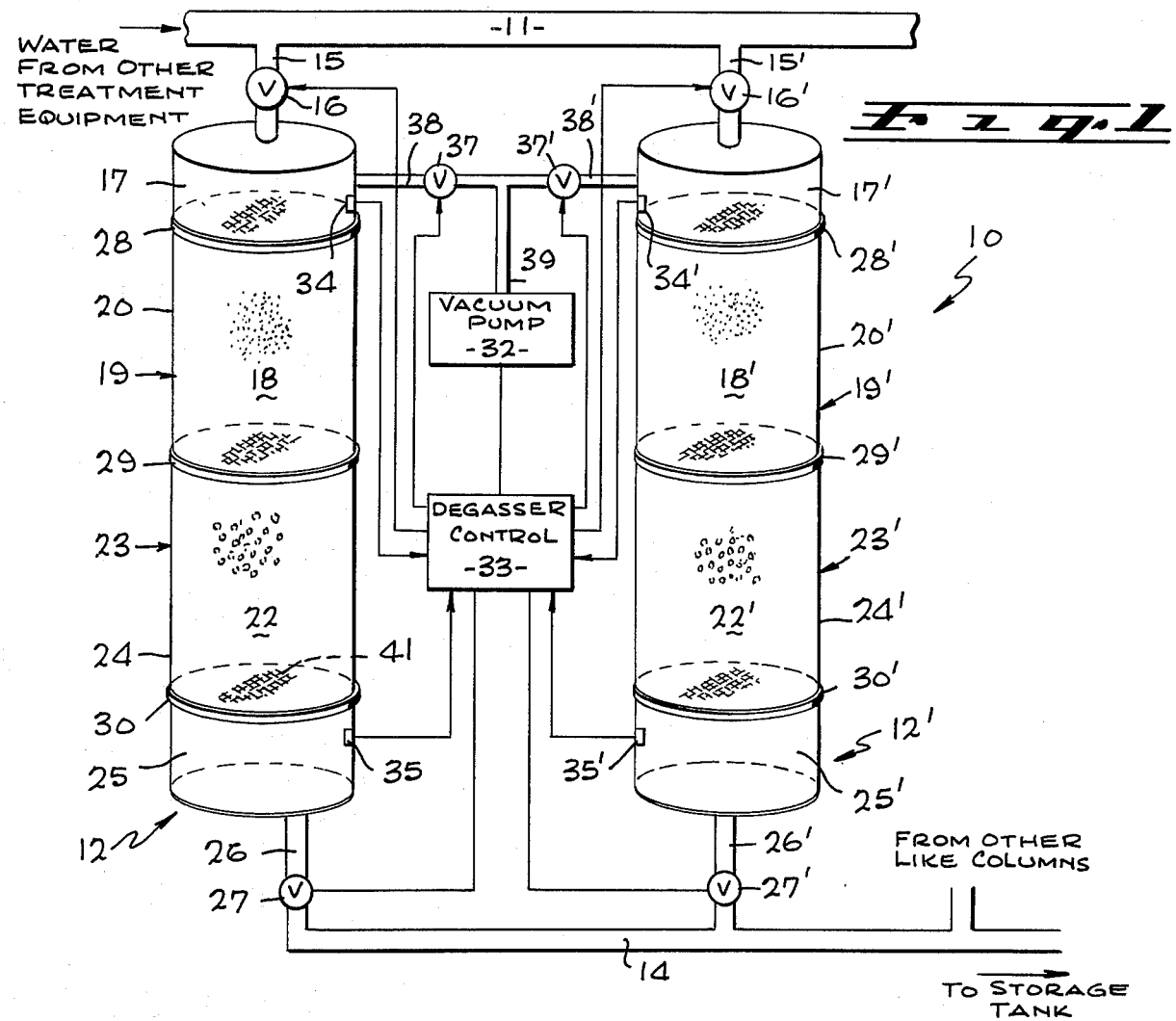
FIG. 1 is a pictorial view, partly diagrammatic, of a water treatment plant employing the inventive system for removal of toxic heavy metals.

Referring to FIG. 1, there is shown a drinking water treatment plant incorporating the inventive system 10 for removal of heavy metal ions. Advantageously, the system 10 forms the final process step, and receives water from other conventional treatment equipment via an inlet duct 11. The system 10 incorporates one or more columns 12, 12' connected in parallel between the inlet duct 11 and a common outlet duct 14 which conducts the water from which the heavy metals have been removed to a storage tank (not shown) for eventual distribution to domestic users.

In the typical column 12, water flows from the inlet duct 11 through a branch duct 15, a valve 16 and a flow chamber 17 into a first bed 18 of activated, particulate zinc. The zinc bed 18 is contained in a drum or cartridge 19 having a cylindrical wall 20 which forms part of the column 12. From the zinc bed 18, the water flows into a second bed 22 of particulate magnesium alloyed with a small quantity of manganese to reduce its corrosivity. The magnesium bed 22 similarly is contained in a cartridge 23 having a wall 24 that also functions as a component of the column 12. From the Mg/Mn bed 22, the water flows through a support chamber 25, a branch outlet line 26, and a valve 27 to the outlet duct 14. Appropriate fittings 28, 29 and 30 are provided to retain the cartridges 19 and 23 in place. The column 12' is identical to the column 12 and contains like components designated by the primed numerals 15' through 30'.

A vacuum pump 32 and a degasser control 33 cooperate intermittently to remove entrapped air and/or generated hydrogen alternately from the several column 12, 12' etc. To this end, each column is provided with an inlet pressure sensor 34, 34' and an outlet pressure sensor 35, 35'. Normally there is only a very slight water pressure drop between the inlet flow chamber 17 and the outlet support chamber 25. Under this condition, the control 33 maintains a valve 37 closed and the pump 32 off. The pump 32 may comprise an aspirator.

As air or generated hydrogen becomes entrapped in the reactant beds 18 or 22, a pressure differential results between the water inlet pressure, as measured by the sensor 34, and the lower, water outlet pressure measured by the sensor 35. When this pressure differential becomes sufficiently great, the control 33 causes the water inlet and outlet valves 16 and 27 to close, and causes the valve 37 to open so as to provide an exhaust path via a duct 38 and a line 39 to the vacuum pump 32 which is energized by the control 33. The pump 32 is run for a sufficient duration of time so exhaust the entrapped gasses from the beds 18 and 22. Thereafter the control 33 causes the valve 37 to close and the valves 16 and 27 to open so as to reinsert the column 12 in the water treatment flow path.

The control 33 operates in a similar manner to accomplish degassing of the column 12' when this is necessary, as sensed by the pressure differential measured by the sensors 34' and 35'. In this instance, the valves 16' and 27' are closed, and a valve 37' is opened to provide an exhaust path via the duct 38' and the line 39 to the energized pump 32. Appropriate interlock provision is made in the control 33 so that only one column 12, 12' etc. is being degassed at any time. In this way, the treatment system 10 can operate continuously since e.g., if one column is being degassed, heavy metal removal will still be accomplished by the remaining columns, and water flow to the storage tank will not be interrupted. Advantageously, the storage tank is of sufficient size so that the water pressure supplied to the users will not drop noticeably when one of the columns 12, 12' is temporarily closed to water flow to accomplish degassing.

In accordance with the present invention, the reactant bed 22 preferably utilizes magnesium alloyed with a small amount of manganese to improve the Mg corrosion resistance. The Mg/Mn in the bed 22 preferably is particulate or granular. The particle size is not critical, however, less material is required if finer sized granules are used, since there is a commensurate increase in the surface area for a given volume of material. On the other hand, if the particles are extremely small, a greater water pressure drop will be present through the bed. This becomes a trade-off consideration in a particular installation. It has been found, however, that Mg/Mn turnings commensurate in size with 20-mesh granules are satisfactory for use in the system 10. Of course, larger particles, or granules of smaller size (say 40-mesh or perhaps even as small as 100-mesh) may be used.

Figure 2:
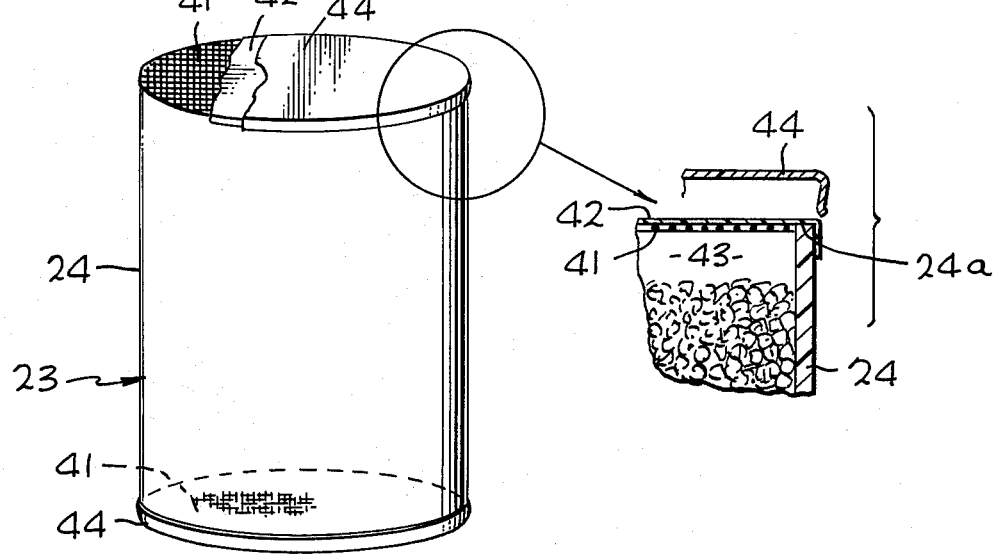
FIG. 2 is a pictorial view, partly broken away and in section, of a drum or cartridge used for storage and shipment of magnesium granules, and insertable into the plant of FIG. 1 so that the material therein becomes a treatment bed without removal from the cartridge.

Magnesium particles of the size advantageously used in the system 10 may ignite upon heating in air. The packaging of FIG. 2 is intended to minimize this danger, as well as to simplify the magnesium bed replacement in the column 12 or 12'. To this end, the Mg/Mn granules 22 advantageously are prepackaged in a drum or cartridge 23 that has a cylindrical wall 24 of a size commensurate with the column 12. The wall 24 advantageously is formed of a corrosion-resistant plastic material, such as that sold by the AMERON Corporation of South Gate, Calif. under the trademark "BONDSTRAND".

Each end of the cartridge 23 is covered by a screen 41 having a mesh size that is appropriate to retain the magnesium granules within the drum. Covering each end screen 41 is a hermetic barrier 42 of a material which is either frangible or soluble in water. For example, the barrier 42 may comprise a polyethylene sheet that is sufficiently thin so as to be torn apart and washed away by the force of the water flowing through the cartridge 23 after it has been installed in the column 12. Alternatively, the barrier 42 may comprise a water soluble organic membrane material such as food-grade carboxymethyl cellulose or methylcellulose.

Advantageously, the barrier 42 is adhesively or otherwise bonded to the lip 24a (FIG. 2) of the drum wall 24 so as to form a hermetic seal for a gas 43 contained within the cartridge 23. The gas 43 is either an inert gas such as argon, or some other gas such as nitrogen or $CO_2$ which is substantially non-reactive with the magnesium. By using such an inert or non-reactive atmosphere 43, the cartridge 23 can be stored and handled with minimal danger of spontaneous combustion of the magnesium contained therein. To protect the screen 41 and barrier 42 from breakage during such storage and shipment, both ends of the cartridge 23 are covered by a lid 44 of metal or other rigid material. When the cartridge is to be installed in the column 12, both lids 44 are removed, and the cartridge 23 is inserted in the column 12 with the barriers 42 intact. Once fastened in place by means of the fittings 29 and 30, water flow is started through the column 12. The initial water flow eliminates the barriers 42 by tearing or dissolution as discussed above. The screens 41 remain in place to retain and support the magnesium granules 22.

The use of magnesium alloys that contain manganese is important for corrosion resistance; that is, to minimize metal loss and hydrogen gassing through reduction of water. Very small concentrations of Mn in the alloy are sufficient to reduce the corrosion rate of Mg to levels at which the Mg/Mn bed 22 will have a useable lifetime in the system 10 of many months. Acceptable binary alloys may have Mn concentrations as low as about 0.2 weight percent, with the Mn present as alpha-Mn precipitated from solid solution in Mg below the peritectic at 653° C and 2.2 wt. % Mn. More than 2.2 wt. % is not considered harmful, but it is wasteful of Mn, and thus uneconomic, for it is the few percent of Mn that actually go into solution in the Mg and are then precipitated that are most effective in scavenging the deleterious trace elements which promote corrosion of the Mg.

It is not required that binary alloys be used, and Mg/Mn alloys containing other metals also are satisfactory. For example, alloys containing small amounts of aluminum, zinc, and/or iron also are useful in the present invention. By way of example, turnings of the commercially available magnesium anode alloy A-H1 have been found to work well in the system 10. This alloy has the following typical assay:

| | |
|---|---|
| Mg | 96.75 wt. % |
| Mn | 0.75 wt. % |
| Al | 1.5 wt. % |
| Zn | 1.0 wt. % | with all other trace metals in the alloy being less than 0.005 weight percent. Granules of the Mg/Mn alloy are preferred. These may be prepared by dropping the molten metal into oil in an inert gas atmosphere. For example, droplets of the metal may be directed to fall through a jet of oil wherein they solidify into granules. The process is carried out in a chamber filled with a gas that is inert (e.g., argon) or non-reactive with magnesium.

The zinc used for the bed 18 preferably is in granular form, although spheres, microturnings (i.e., lathe chips)

or milling chips are acceptable. The latter two forms provide a lesser pressure drop through the bed, but require a greater bed depth to remove a like amount of heavy metal ions. Zinc granules may be prepared in a hammer mill, or can be produced by directing droplets of the molten metal into water. Advantageously, the zinc granules are of odd shape with low sphericity. The zinc particle size is not critical. Granules of 20-mesh size are quite satisfactory. Smaller sized particles of say between 40-mesh and 100-mesh also work quite well. In general, the water pressure drop across the bed increases with decreasing zinc particle size, but the bed depth and hence the amount of required material decreases.

Activation of the zinc particles is preferred for the bed 18. Advantageously, this involves flowing a solution of a noble metal (e.g., copper, silver, nickel) salt through the zinc 18 prior to insertion of the cartridge 19 into the system 10. For example, a solution of copper sulfate may be directed through the zinc 18 before the end lids (like the lids 44 of FIG. 2) are placed on the drum 19. Alternatively, the zinc particles may be immersed in the activating solution prior to packaging in the cartridge 19. Since the zinc in either activated or unactivated form is not particularly reactive with the atmosphere, there is no requirement to provide barriers (like the barriers 42 of FIG. 2) for the cartridge 19, although end screens 41 are used. Although activation of the zinc bed 18 could be carried out in situ in the column 12, this is not preferred, since flow of the activating salt through the cartridge 23 may activate the Mg 22 to a degree where it will react or disintegrate in the column.

Activation of the zinc 18 substantially decreases the "half-length"; that is, it substantially reduces the zinc bed depth required to remove a given percentage of heavy metal ions in the water being treated. The mechanism by which such activation operates to increase the reaction effectiveness of the zinc is not definitely known, but may involve the following process. Small crystals of the activating metal (copper, silver, nickel, etc.) deposit at localized regions on individual zinc granules. This creates an electrochemical cell, with the copper or other metal deposit forming a cathodic area, surrounded by an intense local electric field. Reaction with heavy metal ions in the water is promoted by the cell, with a pit being produced on the same zinc particles as some zinc dissolves at the anodic area of the cell.

Use of the tandem bed arrangement in the system 10 is particularly advantageous. The zinc bed 18, through which the water flows first, removes copper and mercury with great efficiency, these being metals which can accelerate the corrosion of magnesium. Such prior removal by the zinc results in increased effective lifetime of the Mg/Mn bed 22, since these potentially corrosive metals are substantially absent from the water which then flows through the magnesium bed. Zinc also removes selenium as selenate, and also the elements nickel and lead. The magnesium is particularly effective in removing cadmium and silver, as well as removing any excess zinc present in the water supplied to the column 12 or introduced into the water by the first treatment stage zinc bed 18. The Mg/Mn bed 22 also continues the removal of arsenic and chromate. The tandem bed does not affect hypochlorite ("residual chlorine") significantly. Thus there is no need to rechlorinate the water supplied to the storage tank via the outlet duct 14 after tandem-bed treatment by the inventive system 10.

The reactions which occur in the zinc and Mg/Mn beds 18 and 22 are known per se, and generally involve electrochemical replacement of heavy metal ions that have electrochemical potentials below that of zinc or magnesium respectively. Such reactions are listed generally in the textbook *OXIDATION-REDUCTION POTENTIALS* by Wendell Latimer.

By way of example, mercury in the form of mercuric $Hg^{++}$ ions reacts with zinc in the bed 18 the following fashion:

$$Hg^{++} + Zn \rightarrow Hg + Zn^{++}$$

wherein the reduced mercury $Hg°$ forms an amalgam or solid solution in the zinc. Although this decreases the amount of zinc available for reaction in the bed 18, the minute concentration of mercury (in the very low parts per billion range) allows the bed 18 to be used for many months before requiring replacement.

Selenium in the form $SeO_3^=$ may react with zinc according to the following equation.

$$4\tfrac{1}{2} H_2O + 3Zn + 2SeO_3^- \rightarrow 2Se + 3Zn^{++} + 9OH^-$$

Typical arsenate $AsO_4^=$ reduction reactions with zinc include:

$$5Zn + 2AsO_4^- + 16H^+ \rightarrow 5Zn^{++} + 2As + 8H_2O$$

or a corresponding production of hydroxide:

$$5Zn + 2AsO_4^- + 8H_2O \rightarrow 5Zn^{++} + 2As + 16OH^-$$

In all of these reactions, the residual $Zn^{++}$ ions present in the water leaving the zinc bed 18 are eliminated by reaction with magnesium in the bed 22.

Typical of the reactions in the Mg/Mn bed 22 is that which accounts for cadmium removal:

$$Cd^{++} + Mg \rightarrow Cd + Mg^{++}$$

wherein the cadmium "plates out" or deposits on the remaining magnesium particles in the bed 22. The $Mg^{++}$ ions remain in the water, but are non-toxic to humans in the amounts present. It is believed that the deposited cadmium actually increases the activity of the magnesium particles in a manner similar to the activation of zinc discussed above. Thus the deposited cadmium forms with the magnesium an electrochemical cell wherein the cadmium buildup area is the cathode and wherein a pit develops in the anodic area from which $Mg^{++}$ ions are produced. Thus the Mg/Mn bed 22 actually becomes more effective with time. Zinc ions react similarly with the magnesium, and preactivation of the Mg/Mn bed by flow-through or immersion in a zinc solution may be advantageous.

It has been found that the water flow through the particulate beds 18 and 22 is a combination of laminar and turbulent, with no abrupt transition at some particular flow rate. Rather, at every flow rate of practical interest, a given streamer will pass through regions of intense turbulence, and even at the highest flow rates, the turbulence induced in the streamer may later be dumped to laminar flow in another region of the bed. The principal difference between a high flow rate and a low one is that at the higher rate there are more turbulent localities in the bed, and the turbulence is more intense.

The overall effect of turbulent energy dissipation is measured by the pressure drop across the bed at the given flow rate. This follows a power law fairly consistently over nearly two orders of magnitude of flow rate, that is:

$$\Delta p = dkv^x$$

where $d$ is the depth of the bed, $k$ is a constant, and $v$ is the flow rate. The exponent $x$ is characteristic of the shape of the particles used to pack the bed. Turnings, depending on the exact configuration of the individual elements, their size, and method of packing, gave values of $x$ ranging from 1.5 to 2.0. Generally spherical particles have an exponent of about 1.4, while 20-mesh zinc granules show a value of $x=1.5$, with a possible upturn to $x=2$ at very high flow rates.

An important feature of the present invention is the "half-length" characteristic of the reactant beds 18 and 22. This is an analogue of the radioactive half-life applied to the heavy metal ion content of a volume element of water flowing through a uniformly packed bed at a uniform speed. Specifically, if a solution of 1 ppm $Hg^{++}$, on flowing through $y$ inches of granulated zinc at a rate $r$ loses half its mercury content, then it has been found that on flowing through $2y$ inches at the same rate, the content will be reduced to one-fourth ppm, to one-eighth ppm at $3y$ inches, and so forth. The concept holds within limits sufficiently accurate for design purposes, and facilitates very simple system scale-up. The "half-lenght" concept rests on two assumptions which have been confirmed experimentally. First, the driving-force for electrochemical exchange does not vary significantly with concentration, and it is so large that diffusion is the rate-limiting step, rather than the chemical reaction. Second, for any given flow rate and a given uniform bed, the diffusion rate is constant over the length of the bed.

Typical half-lengths for heavy metal ions of interest are listed below for a flow rate of 100 ml/sec through a column of 3 inches I.D., that is, 14.15 ml/(sec, in$^2$), using 20-mesh zinc granules:

| Mercury (mercuric) | 3 ppm | 5cm |
|---|---|---|
| Lead (plumbous) | 3 ppm | 8cm |
| Selenium (selenous) | 5 ppm | 6cm |

At this flow rate the half-length for copper was too short to measure accurately, being less than 1 cm. It is noteworthy that all of these half-lengths are extremely short, indicating that the depth of the reactant beds may be quite shallow, with a concomitantly small amount of reactant material.

Also of significance is that the half-length for mercury is not strongly affected by flow rate, increasing very slowly as the flow accelerates. With lead, the half-length increases with flow rate although the increase is not linear. The following examples for 20-mesh granulated zinc, are typical.

| Flow rate | Half-length | |
|---|---|---|
| (gal/in$^2$ hr) | (cm) | |
| | Mercury | Lead |
| 1.35 | 4.5 | 3 |
| 14.6 | 5.5 | 8 |
| 40–60.5 | 6.25 | 20 |

Thus the system 10 design for a municipality with a lead problem might be quite different from that used to remove mercury at another location. In the lead case, one might wish a shallow bed or large area and slow flow, while for mercury a deep, narrow, high-rate bed might be the preferred design. In either case, minimization of the amount of zinc in the bed is a design consideration, as are the power consumption and pump requirements for overcoming the pressure drop through the reactant beds.

The following examples illustrate how these considerations may be used in designing the system 10 for a particular application.

Case 1, Mercury:

A town in the Fox River Valley, Illinois, has been purchasing water from a neighbor. The source of water is the local aquifer, which is uncontaminated, but the pumps used for withdrawing it are mercury-sealed. Analysis reveals peak values of 10 ppb mercury in the water purchased: the U.S.P.H.S. limit is 5 ppb and the more recent proposed EPA limit is 2 ppb. The population of the purchasing town is 50,000 and not expected to grow substantially. System design may proceed as follows.

Allow 200 gal/capita-day, on the basis of the light-industry consumption rate characteristic of the town; this gives 10,000,000 gal/day. At a flow rate of 60.5 gal/in$^2$hr, this will require 6,887 in$^2$ of bed, the equivalent of a circle 94 inches in diameter (7'10"). At 10 ppb mercury, 379 grams of mercury will be delivered to the reductor each day: but this is obviously a high estimate, for if that value were continuously maintained, the mercury-sealed pumps would soon quit for lack of sealant. The average value is not likely to be more than a few grams a day. There is thus no question of economic recovery of mercury, nor or a rapid consumption of the bed. Equally, there is no need for over-design: it is simply necessary to keep those 10 ppb surges from getting through. Unfortunately, the timing of these surges cannot be predicted, and although most of the water meets EPA standards, all of it must be treated. We decide, therefore, that a depth of three half-lengths, which will reduce mercury content by a factor of eight, will be ample. This gives a bed roughly 20 cm, or 8 inches, deep.

The total pressure drop will be roughly 8 × 30 inches of water, a 20-foot head, or 8.67 psi, which is certainly not excessive. The volume of the bed is 8.99 × 10$^5$ cm$^3$, of which some 30% is void space, giving 6.22 × 10$^5$ cm$^3$ of metal, weighing 4.44 metric tons which is less than $5,000 worth of metal at today's prices. There is thus small motivation to reduce the size of the bed by raising the flow rate. However, a few alternatives dramatize the fact.

Assume that the half-length for mercury remains constant as the flow rate is doubled, which is consistant with the figures given above. This will halve the amount of metal, requiring only 2.22 metric tons, at a cost of less than $2500. But the diameter of the column (i.e., of the drum 19) shrinks by only 30%, and it was scarcely bulky to begin with. On the other hand, the pressure loss goes up by $2^{3/2}$ at least, if not $2^2$, to 24.5 or 34.7 psi. This is still not out of line, but surely the $2200 of zinc saved is insufficient to pay for the additional pumping capacity and operating expense.

The situation remains essentially unchanged even for an assumed consistent mercury level of 10 ppb. It is possible to make the bed thicker, or to replace it once a year; but even if all the mercury going through were to be caught, it would only amount to 138.3 kg, only a few percent of the mass of the bed.

Case 2, Lead:

The EPA upper limit for this element is 50 ppb. Let us assume that a town similar to the one just cited has a water supply running consistently at 200 ppm (such concentrations might be found near Joplin, Missouri) and that it is desired to reduce it to half the EPA limit, that is, from 200 to 25 ppb. This again requires three half-lengths, but for lead the half-lengths are larger than for mercury at the faster flow rates, around 20 cm. Thus, in the lead case, the bed to handle $10^7$ gal/day at 60.5 gal/in$^2$hr would again have an area of 6,887 in$^2$, but would be three times as deep: 60 cm or 24 inches. The zinc inventory would be three times as large, but still under $15,000. The pressure drop would be increased by the same factor, to a 60-foot head, which would begin to raise questions about pumping costs.

Now, the half-lengths for lead is a function of the flow rate, much more so than for mercury. At a flow rate of 14.6 gal/in$^2$ hr, the half-length will be taken as 8 cm. The depth is now 24 cm, a reduction by 60/24, and the area is about quadrupled (60.5/14.6). The volume and mass of the zinc bed thus increases by only a factor of 1.66, to 22.1 metric tons, less than $25,000 worth of zinc, and the diameter of the bed roughly doubles to some 16 feet, still a rather small unit. The pressure drop is now only about 4 inches of water per inch of bed depth, or some 38 inches, a 3-foot 2-inch head? The cost is roughly $10,000 worth of extra zinc. Plainly, it is profitable to substitute zinc for pumping capacity. At 200 ppb, with seven-eighths removal, some 6.62 kg of lead are trapped per day, or 2.42 metric tons a year. Some eight-tenths of a ton of zinc will have disappeared from the bed, or roughly three to four percent. Clearly the larger bed is justified in terms of its duty and the time elapsed between refills.

In the embodiment of FIG. 1, the degasser control 33 is responsive to a pressure drop across the reactant beds. This is not required. Alternatively, the control 33 may be actuated by a timer (not shown) that causes vacuum suctioning of the columns 12, 12' one at a time. Advantageously, a duty cycle is established wherein each column is degassed in succession. For example, column 12 might be suctioned first for a period of several seconds or minutes, followed by a time during which no degassing occurs. Then the column 12' is suctioned for a like brief time period, followed by another dwell time with no degassing. This regimen goes continuously during operation of the system 10.

The use of intermittent vacuum degassing of the columns 12, 12' allows the use of very fine particles for the beds 18, 18', 22 and 22'. With such fine particles, clogging can occur rather easily due to entrapped air or generated hydrogen bubbles. However, this clogging quickly is eliminated by the degassing.

Intending to claim all novel, useful and unobvious features, shown or described, the inventor claims:

1. A system for the removal from drinking water of heavy metal ions by electrochemical replacement, said heavy metal ions being selected from the group consisting of ions of mercury, copper, selenium, nickel, lead, arsenic, chromium, cadmium and silver, comprising at least one treatment column having:
a water inlet duct and a water outlet duct,
a first cartridge containing particles of zinc, said cartridge having screened inlet and outlet openings permitting water flow-through but retaining said zinc particles within said first cartridge, said zinc particles being activated prior to insertion of said first cartridge into said treatment column by contact with a solution of a salt of a noble metal selected from the class consisting of copper, nickel and silver,
a second cartridge containing particles of magnesium alloyed with a minor amount of manganese to inhibit water corrosion of said magnesium, said second cartridge having screened inlet and outlet openings permitting water flow-through but retaining said magnesium/manganese particles within said second cartridge, said magnesium/manganese particles being prepackaged in said second cartridge prior to insertion of said second cartridge in said treatment column, said prepackaged second cartridge having an atmosphere consisting of a gas that is non-reactive with said magnesium, said second cartridge further comprising end barrier means, covering and hermetically sealing said screened inlet and outlet to retain said non-reactive atmosphere within said cartridge, said barrier means being removed by the initial flow of water through said cartridge after said second cartridge is inserted in said treatment column, and
adaptor means for releasably retaining said first and second cartridges in said column with said respective inlet and outlet openings positioned to permit flow of water from said inlet duct to said outlet duct sequentially first through said first cartridge and then through said second cartridge.

2. A system according to claim 1 further comprising:
degasser means for intermittently removing by suction entrapped air and generated hydrogen from said first and second cartridges.

3. A system according to claim 1 wherein for a particular heavy metal ion, the concentration of said particular ion in said water is reduced by about one-half in a certain "half-length" depth of particles in that one of said cartridges which is a reductant for said particular ion, and wherein the depth of said one cartridge is selected to be a sufficient number of said "half-lengths" to reduce the concentration of said particular ion to below a selected limit.

4. A system according to claim 1 comprising at least one additional like treatment column, together with:
degasser means for intermittently, alternately shutting off water flow through each of said treatment columns and for evacuating entrapped air and/or generated hydrogen from the column in which water flow is stopped.

5. A system according to claim 4 wherein said degasser means comprises:
cut-off valves in the inlet and outlet ducts for each treatment column,
a vaccum pump,
a suction line connecting the inlet end of each treatment column, between said inlet duct cut-off valve and said first cartridge, to said vacuum pump via a suction line valve, and
control means, operative on one treatment column at a time, for (a) closing said inlet and outlet duct cut-off valves of said one treatment column, (b) opening the suction line valve for that column, and (c) energizing said pump, said pump thereby suctioning entrapped air and generating hydrogen from said first and second cartridges in said one treatment column, said control means being operative to close said suction line valve and to open said inlet and outlet duct cut-off valves open completion of said suctioning.

6. A system according to claim 5 further comprising sensor means in each of said columns for determining the water pressure drop across said first and second cartridges, said control means being operative to initiate suctioning in a certain treatment column in response to detection of a water pressure drop through said certain column above a preselected level.

7. A system according to claim 5 wherein said control means includes a timer for periodically causing degassing of each treatment column for a fixed time period, different columns being degassed at different times.

* * * * *